US009446932B2

(12) United States Patent
Nobles

(10) Patent No.: US 9,446,932 B2
(45) Date of Patent: Sep. 20, 2016

(54) POLE LIFTING AND SETTING DEVICE

(75) Inventor: Robert Lee Nobles, Farmville, NC (US)

(73) Assignee: Wahoo Innovations, Inc., Farmville, NC (US)

( * ) Notice: Subject to any disclaimer, the term of this patent is extended or adjusted under 35 U.S.C. 154(b) by 0 days.

(21) Appl. No.: 13/523,386

(22) Filed: Jun. 14, 2012

(65) Prior Publication Data

US 2012/0321416 A1 Dec. 20, 2012

Related U.S. Application Data

(60) Provisional application No. 61/497,131, filed on Jun. 15, 2011, provisional application No. 61/534,930, filed on Sep. 15, 2011.

(51) Int. Cl.

*A01G 23/02* (2006.01)
*B66C 1/18* (2006.01)
*E04H 12/34* (2006.01)
*E04H 17/26* (2006.01)

(52) U.S. Cl.

CPC ............... *B66C 1/18* (2013.01); *E04H 12/347* (2013.01); *E04H 17/263* (2013.01); *E04H 17/265* (2013.01)

(58) Field of Classification Search

CPC ........ B66F 9/06; B66F 9/07554; B66C 1/62; E04H 12/34; E04H 12/345; E04H 12/347; E04H 17/263; E04H 17/265; A01G 23/043
USPC ...... 414/10–12, 23, 816, 910; 182/9; 294/74
See application file for complete search history.

(56) References Cited

U.S. PATENT DOCUMENTS

| | | | | | |
|---|---|---|---|---|---|
| 791,968 | A | * | 6/1905 | Wiley | 254/387 |
| 873,044 | A | * | 12/1907 | Hanson | B66C 1/18 294/157 |
| 873,799 | A | * | 12/1907 | Shafer | 254/242 |
| 1,218,714 | A | * | 3/1917 | Sunderland et al. | 294/74 |
| 1,405,052 | A | * | 1/1922 | Maher | B66C 1/14 294/150 |
| 1,658,042 | A | * | 2/1928 | Druschel | 187/242 |
| 1,699,480 | A | * | 1/1929 | Snow | 52/117 |
| 1,829,860 | A | * | 11/1931 | Herrmann | B66C 1/18 294/74 |
| 2,215,935 | A | * | 9/1940 | Pyeatt | 414/23 |
| 2,725,991 | A | * | 12/1955 | Maenpaa | 414/23 |
| 2,822,067 | A | * | 2/1958 | Price | 52/121 |
| 3,352,433 | A | * | 11/1967 | Moore | E02F 3/962 414/23 |
| 4,068,827 | A | * | 1/1978 | Fanning et al. | 254/325 |
| 4,239,443 | A | * | 12/1980 | Rysewyk | 414/618 |
| 4,620,693 | A | * | 11/1986 | Vialars et al. | 254/335 |
| 4,718,564 | A | * | 1/1988 | Bailey | 212/179 |
| 4,851,980 | A | * | 7/1989 | McWilliams et al. | 362/403 |
| 4,856,836 | A | * | 8/1989 | Delphin | 294/74 |
| 4,878,160 | A | | 10/1989 | Reneau et al. | |
| 5,056,819 | A | | 10/1991 | Hayes | |
| 5,078,364 | A | * | 1/1992 | Harrell | 254/387 |

(Continued)

*Primary Examiner* — Michael McCullough
*Assistant Examiner* — Lynn Schwenning
(74) *Attorney, Agent, or Firm* — Nexsen Pruet, PLLC; E. Eric Mills

(57) ABSTRACT

The invention provides a pole lifting apparatus. The pole lifting apparatus including a base section having a base plate; one or more mast sections connected to the base section and extendable in an axial manner therewith, wherein an uppermost mast section of the one or more mast sections comprises a pulley mounted at its uppermost end; and a hoist secured to the base section and having a wire rope operably associated with the one or more mast sections and pulley for use in a pole lifting operation.

27 Claims, 8 Drawing Sheets

(56) References Cited

U.S. PATENT DOCUMENTS 5,220,976 A * 6/1993 Gunter .............................. 182/3
5,370,286 A 12/1994 Newman
5,398,478 A 3/1995 Gordin et al.
5,595,411 A * 1/1997 Delisle ............................ 294/74
5,603,545 A 2/1997 Benson et al.
5,794,387 A 8/1998 Crookham
5,797,504 A * 8/1998 Mangum ....................... 212/303
6,234,453 B1 * 5/2001 Block ........................... 254/285
6,554,254 B2 * 4/2003 Vetesnik ....................... 254/325
6,641,347 B2 * 11/2003 Ewington ....................... 414/23
6,648,570 B2 11/2003 Munn
6,709,215 B1 3/2004 Sorensen
7,137,616 B2 * 11/2006 Kysely .................. E04H 17/265
254/30
7,267,516 B1 9/2007 Sorensen
7,278,670 B2 * 10/2007 Galletta .................... B66C 1/20
294/74
7,367,425 B2 5/2008 Rivers et al.
7,866,927 B1 * 1/2011 Wong .............................. 411/23
8,444,361 B1 * 5/2013 Hershey .......................... 414/23
2004/0040925 A1 * 3/2004 Miller ........................... 212/180
2009/0072560 A1 * 3/2009 Tien .......................... B66C 1/18
294/74
2011/0049203 A1 3/2011 Stark
2011/0064535 A1 3/2011 Tardif et al.

* cited by examiner

POLE LIFTING AND SETTING DEVICE

1 CROSS-REFERENCE TO RELATED APPLICATIONS

This patent application is a nonprovisional of, is related to, and claims priority to U.S. Provisional Patent Application Nos. 61/497,131, filed on Jun. 15, 2011; and 61/534,930, filed on Sep. 15, 2011. The entire disclosures of which are specifically incorporated by reference herein in their entirety.

2 FIELD OF THE INVENTION

The present invention generally relates to a pole lifting and setting device. In particular, the present invention is directed to a device that is designed to install, remove, and/or service poles, such as light poles, wherein such poles may be mounted on concrete pedestals, in the ground, or other pole mounting surface.

3 BACKGROUND OF THE INVENTION

There have been previous devices developed, which are complex and expensive, that grip a pole and position it upright or remove it from a pedestal using hydraulic pressure, for example.

Reneau et al. in U.S. Pat. No. 4,878,160 is related to a service pole assembly that utilizes a pair of hinged support members to provide either a support of the pole in an erect position or to permit the pole to swing downward, to provide access for service or maintenance.

Gordin et al. in U.S. Pat. No. 5,398,478 is related to a method for elevating a structure, such as a pole, which has a base member that is securable in the ground and a portion that extends above the ground. A pole section having a bore inside, a lower end, and an upper end is included. The pole section can be stacked upon the base upward, by slip fitting the pole section into the base end and securing it into place.

Crookham in U.S. Pat. No. 5,794,387 is related to an apparatus for manipulating a pole relative to a base that is rigidly fixed in the ground. The base is gripped and provides a rigid reference point. The pole is cradled and an actuator provides a force that allows the pole to be moved relative to the reference point. The device can detach the pole from the base as well as install it on the base. A pivot mechanism allows the pole to be pivoted with respect to the base to allow the pole to be lowered or to erect the pole vertically and then seat it upon the base.

Sorensen in U.S. Pat. No. 6,709,215 is related to a light-pole erecting and lowering apparatus having a transporting dolly, a pole platform and pedestal attachment frame, and a pole securing assembly. The dolly permits transportation in a horizontal position or an operable vertical position. The pole platform and pedestal attachment frame connects the invention to the pedestal, and the pole assembly permits the pole to be rotated to either a horizontal or a vertical position.

Sorensen in U.S. Pat. No. 7,267,516 is related to a light pole erector and remover having a transportation dolly, a pedestal attaching and lifting mechanism, and a pole tilting mechanism. The pole is horizontally positioned on the tilting mechanism, tied down and rotated to a vertical position over the concrete pedestal and then lowered for attachment to the pedestal.

Installing and removing light poles typically requires large and expensive equipment to lift and erect a pole on a concrete pedestal as the pole must be tilted upward and then lifted onto the pedestal. Since there are multitudes of parking lots and the like throughout the world, and lighting is required, the most common approach is to utilize light poles with lights attached to the top and with concrete pedestals on the bottom to protect the pole from an impact of surrounding vehicles. The poles are typically 20-40 feet, or more, in height, thus making them difficult to handle and requiring specialized equipment. Thus, there is a need for a pole lifting and setting device that is designed to quickly and easily install or remove poles, such as light poles more efficiently, safer, and with less expense, and need for heavy equipment.

An object of the invention is the ability to easily transport the apparatus to a construction site, or for servicing pole in a parking lot, using tires attached to the base bracket. The apparatus thus may eliminate the need for expensive cranes or cherry pickers, as the apparatus is a smaller modular, portable apparatus.

Another object of the invention is that the apparatus may be stored in a collapsed position, thereby permitting easy storage and transportation in, or by, a motor vehicle.

Yet another object of the invention is that any style of pole may be serviced relative to the diameter, shape and style, such as round, square, polygonal, or irregular shape.

Yet another object of the invention is the simplicity of design, as only the essential components are utilized, thus maximizing the utility while minimizing the structure.

4 BRIEF DESCRIPTION OF THE INVENTION

An exemplary object of the invention is to provide an apparatus that permits one or two persons to easily and quickly install, remove, and/or service a pole, such as for example light poles, utility poles and the like. Such a pole may be attached to or mounted on or to an above-ground concrete pedestal, a wall, the ground or other surface or structure. By way of example, the invention may have a base section that may be secured to a pole or a pole mount, such as a pedestal upon which a utility pole, such as a light pole or other service pole, is mounted above a base elevation level. The base section may be secured by the use of high strength straps that attach to the apparatus, wrap around the pole or pole mount, attach at a second point to the base bracket and are tightened to remove slack in the straps and provide for a solid connection of the apparatus to the pedestal. The apparatus may also have one or more mast sections that may either be installed to the base section via a mast base, or telescope from the mast base of the base section, to raise the mast to sufficient height to place the top of the mast above the center of gravity of the utility pole. The top of the mast may have a guide, such as a pulley through which a wire rope, such as a cable, may be run for use in lifting the utility pole. The base section may have a lift mechanism, such as a hoist, attached to the base section from which the wire rope extends from the base section and through the cable guide at the top most mast section. The wire rope may be run through one or more eyelets on the mast sections to help guide the wire rope along the mast sections. The apparatus may attach to a strap for lifting and/or supporting an object and more specifically to a strap for use with a device that is designed to install, service and/or remove poles, such as utility poles, light poles, and the like.

The base section may also have attached tires, for example pneumatic tires, for mobility when the apparatus is required to move from one point to another. The apparatus may also have leg brace stability members serving as outriggers that extend at an angle or perpendicularly from the base section and terminate in adjustable legs that, in parallel with the mast, provide for greater stability during lifting and placement of utility poles. The leg brace stability members may further include adjustable legs, such as a jack, attached at their distal ends. The apparatus may also have angle braces that extend at an angle from a point on the mast to the leg braces to provide further stability during operation of the apparatus.

5 BRIEF DESCRIPTION OF THE DRAWINGS

6 DETAILED DESCRIPTION OF THE INVENTION

The present invention can be used to install a pole, such as a utility pole, light pole, or other similar type pole, onto a mounting surface, such as concrete pedestal, hole in the ground, wall structure, or other similar type mounting surface. It can also remove the pole from the mounting surface so that service may be performed, such as replacing the light at the top of a light pole, then the pole can be replaced back on the mounting surface. Other uses envisioned include hoisting of most any large and/or heavy object, such as, but not limited to, manhole covers, chandeliers, solar panels, condenser units. The device is typically used by securing the apparatus to a mounting surface, for example, strapping the apparatus to a pedestal mount of a utility pole or, alternatively, securing the apparatus to a hitch of a vehicle.

Figure 1A:
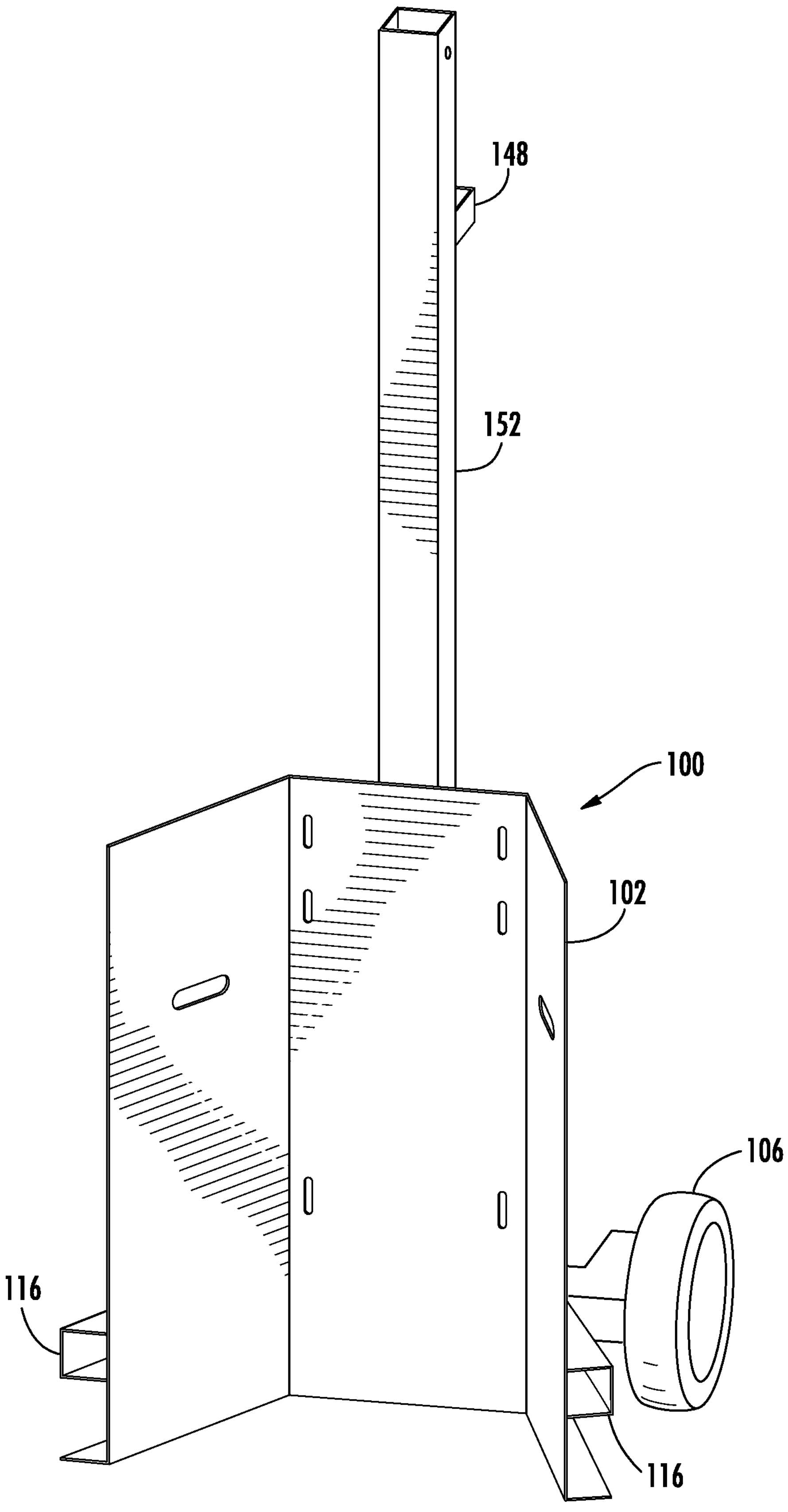
FIG. 1A illustrates a front view of the apparatus consistent with certain embodiments of the invention.
Figure 1B:
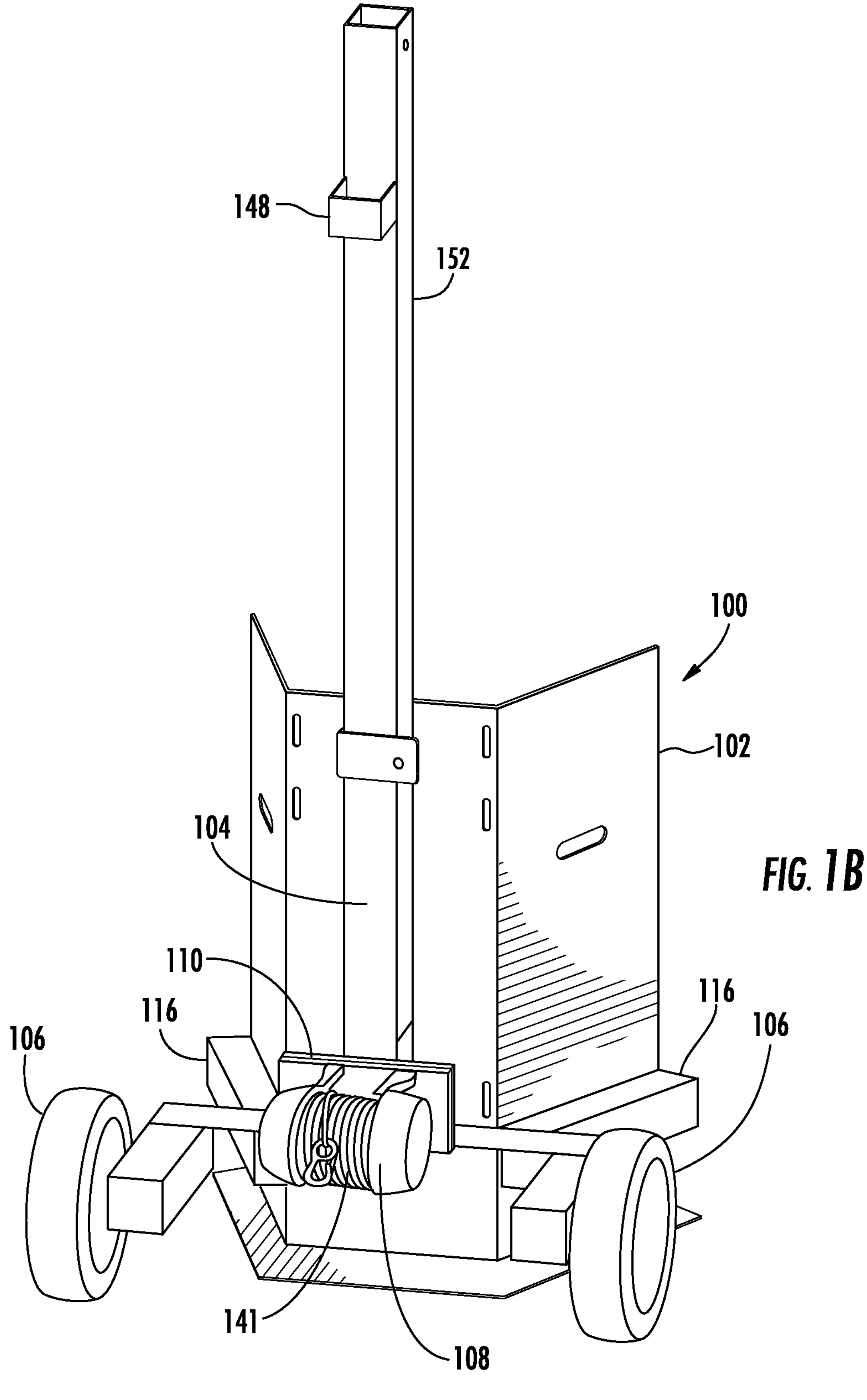
FIG. 1B illustrates a back view of the apparatus consistent with certain embodiments of the invention.

FIGS. 1A and 1B present views of the apparatus consistent with certain embodiments of the invention. A base section 100 of the apparatus is comprised of a base plate 102, a mast base 104, and tires 106. The base section 100 forms the base support of the apparatus onto which the remaining portions of the apparatus are affixed and which is used to form the basis of support when the apparatus is in use. The mast base 104 is affixed to the base section 100 within a slot or other supporting member such that the mast base 104 is held rigidly to the base section 100. In one embodiment mast base 104 is affixed to the base section 100 by a weld, or using a fastening hardware, such as nuts and bolts. The distal end of the mast base 104 is substantially even with or may extend above the base section 100. Base plate 102 may be affixed to the base section 100 by a weld, or using other suitable fastening hardware, such as nuts and bolts.

The apparatus further includes a lifting/lowering device, such as hoist 108. Hoist 108 is configured such that a cable or wire rope 141 of sufficient strength to hoist and hold a utility pole is wound upon a drum of the hoist 108. The wire rope 141 may be unwound from the hoist 108 and extended up the length of the base section 100 and further up the distance of the apparatus for use in lifting and holding operations for poles. The hoist 108 may be attached to the base section 100 by attaching the hoist 108 via a hoist bracket 110 to the base section 100 and securing with securing hardware, such as, one or more lynch pins, nuts and bolts, or the like (not shown). The hoist 108 may then be used to extend and retract the wire rope 141 when the apparatus is operating to lift and install or remove a utility pole. Hoist 108 may be any suitable lifting/lowering device which is known in the art, and may be a electric, hydraulic, or manual hoist.

Figure 2:
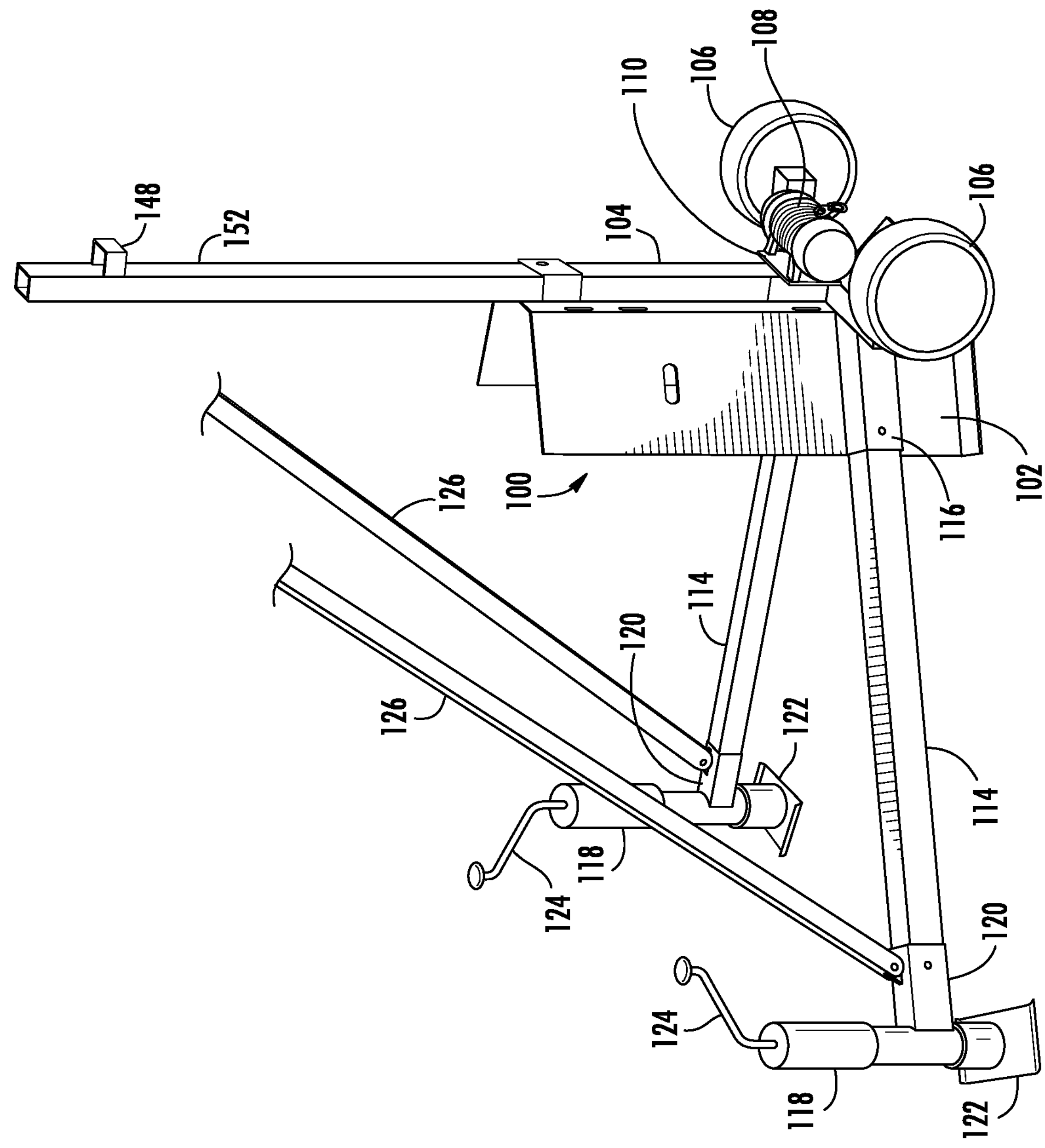
FIG. 2 illustrates a side view of the apparatus consistent with certain embodiments of the invention.

FIG. 2 presents an exemplary side view of an embodiment of the apparatus. In this exemplary embodiment the base section 100 is configured with attached leg braces 114 that extend in an angled fashion, for example at about a 45 degree angle, from the base section 100. In an alternative embodiment leg braces 114 extend in a perpendicular fashion from the base section 100. In yet another alternative embodiment, leg braces 114 may extend out to the sides of base section 100, for example at about a 180 degree angle, from the base section 100. The leg braces 114 are each attached to the base section 100 by inserting the proximal end of the leg brace 114 into receiving brackets 116, which may be positioned on base section 100, or on base plate 102, that secures the proximal end of the leg brace 114 and allows the leg brace 114 to be detached when necessary for repositioning or moving the apparatus. Leg braces 114 may be secured in receiving brackets 116 through the use of securing hardware, such as, one or more lynch pins (not shown), or other suitable securing hardware. At the distal end of each of the leg braces 114, an adjustable leg, such as a jack 118, may be attached by inserting the distal end of the leg braces 114 into a jack receiving bracket 120. Leg braces 114 may be secured in the jack receiving bracket 120 through the use of securing hardware, such as, one or more lynch pins (not shown), or other suitable securing hardware. Jack 118 is configured in a perpendicular orientation to its associated leg brace 114 and parallel to the base section 100. The proximal end of the jack 118 is in contact with the floor, soil, or other surface upon which the apparatus rests with a leveling foot 122 that extends from the jack 118 until it is in contact with the floor, soil, concrete, or other surface. The leveling foot 122 extends and retracts through the use of a jack handle 124. A user may cause the jack handle 124 to be rotated in a first angular direction to extend the leveling foot 122 down away from the jack 118 and in a second angular direction, opposite to the first angular direction, to retract the leveling foot 122 back up toward the jack 118. For additional stability during use, angle braces 126 are attached to the leg braces 114 at the proximal end and to a mast section 142 at the distal end (see FIG. 5). The angle braces 126, just like the leg braces 114, may be removed when the apparatus is not in use for better portability by removing the securing hardware, such as, one or more lynch pins (not shown), or other suitable securing hardware, that secure the proximal and distal ends to the leg braces 114 and a mast section 142, respectively. The angle braces 126 may further include a protective sleeve (not shown) to protect the utility pole from being scratched or damaged by the angle braces 126 during the removal or installation process. By extending the leveling foot 122 such that it is in contact with the surface upon which the apparatus rests, the leg braces 114 attached to their respective jacks 118 provide greater stability to the apparatus when in use and allows leveling of the apparatus.

Retracting the leveling foot 122 such that it is no longer in contact with the surface upon which the apparatus rests allows the apparatus to be moved without removing the leg braces 114 for repositioning purposes.

Figure 3:
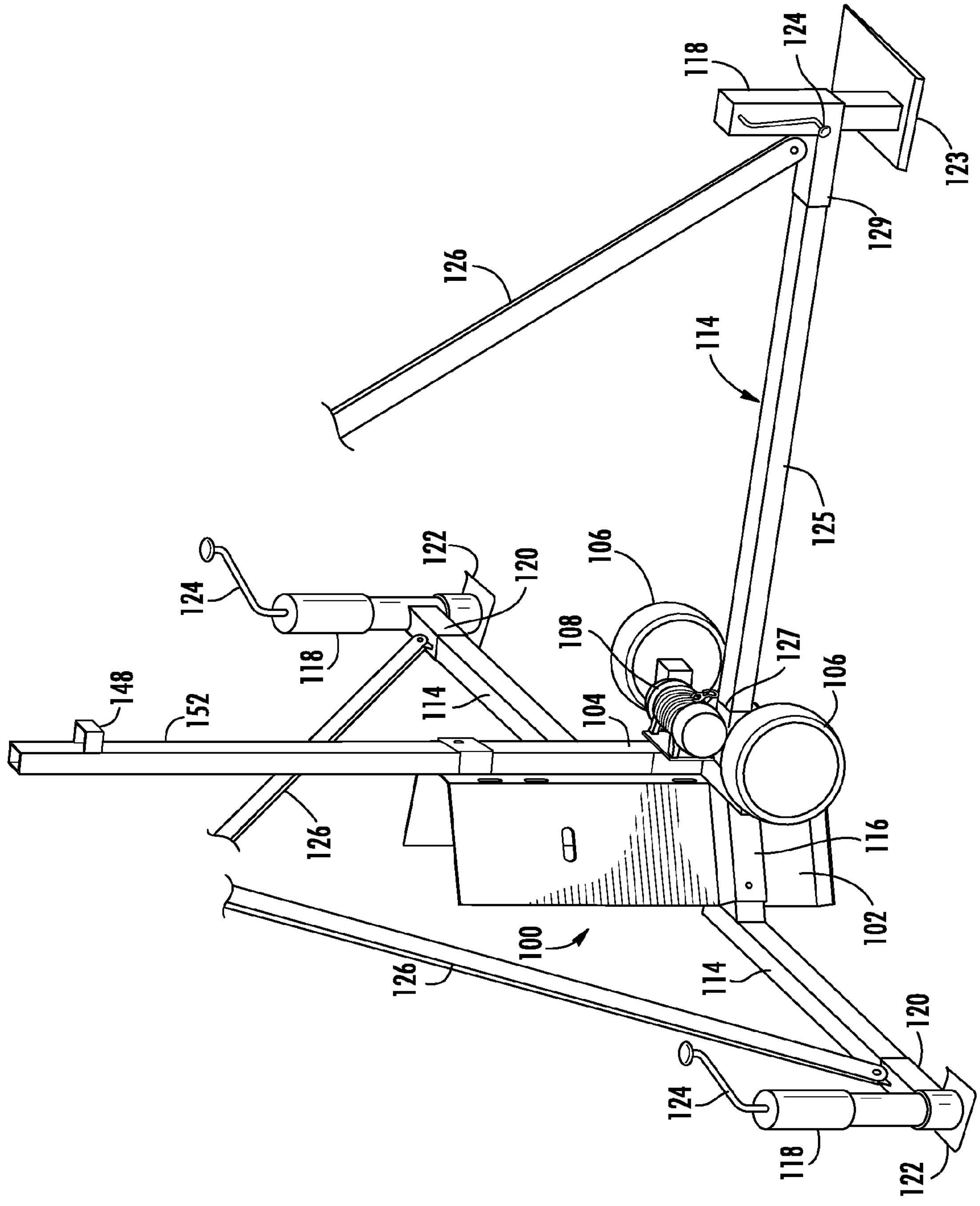
FIG. 3 illustrates another side view of the apparatus consistent with certain embodiments of the invention.

FIG. 3 presents an exemplary side view of an alternative embodiment of the apparatus. In this exemplary embodiment the base section 100 is configured with two (2) attached leg braces 114 that extend out to the sides of base section 100, for example at about a 180 degree angle, from the base section 100 and further includes a third leg brace 114 that includes a hitch bar 125, where the hitch bar 125 is attached at its proximal end to a hitch receiver 127 located at the back of the base section 100. Hitch bar 125 extends out, perpendicular from the back of the base section 100 and is further attached to a plate 123, such as a steel plate, by a third jack 118. Hitch bar 125 attaches to the third jack 118 by its distal end being inserted into a hitch bar receiver 129 of the third jack 118. Hitch bar 125 is secured to the hitch receiver 127 at its proximal end and to the hitch bar receiver 129 at its distal end through the use of securing hardware, such as one or more lynch pins (not shown), or other suitable securing hardware. Plate 123 is similar to leveling foot 122 in that it can be raised and lowered by jack handle 124 associated with the third jack 118. However, plate 123 preferably has a larger surface area than that of leveling foot 122 and functions to allow, for example, a tire of a vehicle to be positioned upon it, so that the vehicle's weight helps to keep the apparatus in place. Third leg brace 114 may further include an additional jack (not shown) attached to the hitch bar 125. The additional jack is preferably attached to the hitch bar 125 at a point in close proximity to where the hitch bar 125 is secured to the hitch receiver 127. The additional jack may be attached to the third leg brace 114 in a similar manner as third jack 118, e.g., through the use of securing hardware, such as one or more lynch pins (not shown), or other suitable securing hardware.

The two (2) leg braces 114 are preferably each attached to the base section 100 by inserting the proximal end of the leg brace 114 into receiving brackets 116 positioned on base section 100, or on base plate 102, that secures the proximal end of the leg brace 114 and allows the leg brace 114 to be detached when necessary for repositioning or moving the apparatus. Leg braces 114 may be secured in receiving brackets 116 through the use of securing hardware, such as, one or more lynch pins (not shown), or other suitable securing hardware. At the distal end of each of the leg braces 114, an adjustable leg, such as a jack 118, may be attached by inserting the distal end of the leg braces 114 into a jack receiving bracket 120. Leg braces 114 may be secured in its respective jack receiving bracket 120 through the use of securing hardware, such as, one or more lynch pins (not shown), or other suitable securing hardware. Jack 118 is configured in a perpendicular orientation to leg braces 114 and parallel to the base section 100. The proximal end of the jack 118 is in contact with the floor, soil, or other surface upon which the apparatus rests with a leveling foot 122 that extends from the jack 118 until it is in contact with the floor, soil, concrete, or other surface. The leveling foot 122 extends and retracts through the use of a jack handle 124. A user may cause the jack handle 124 to be rotated in a first angular direction to extend the leveling foot 122 down away from the jack 118 and in a second angular direction, opposite to the first angular direction, to retract the leveling foot 122 back up toward the jack 118. For additional stability during use, two (2) angle braces 126 are attached to the leg braces 114 at the proximal end and to a mast section 142 at the distal end, and a third angle brace 126 is attached to the third leg brace 114 (e.g., directly to hitch bar 125, or alternatively to the hitch bar receiver 129 or third jack 118), at the proximal end and to a mast section 142 at the distal end. The angle braces 126, just like the leg braces 114, may be removed when the apparatus is not in use for better portability by removing the securing hardware, such as, one or more lynch pins (not shown), or other suitable securing hardware, that secure the proximal end of angle braces 126 to the leg braces 114 and hitch bar 125 (or alternatively to the third jack 118), and the distal ends of the angle braces 126 to mast section 142. As in the previous embodiment, by extending the leveling foot 122 such that it is in contact with the surface upon which the apparatus rests, the leg braces 114 attached to their associated jack 118 provide greater stability to the apparatus when in use and allows leveling of the apparatus. Retracting the leveling foot 122 such that it is no longer in contact with the surface upon which the apparatus rests allows the apparatus to be moved without removing the leg braces 114 for repositioning purposes. The three angle braces 126 may further include a protective sleeve (not shown) to protect the utility pole from being scratched or damaged by the angle braces 126 during the removal or installation process. This embodiment is useful to enable the tool to set a pole against a wall/fence or on top of a wall, and is especially useful for parking decks.

Figure 4:
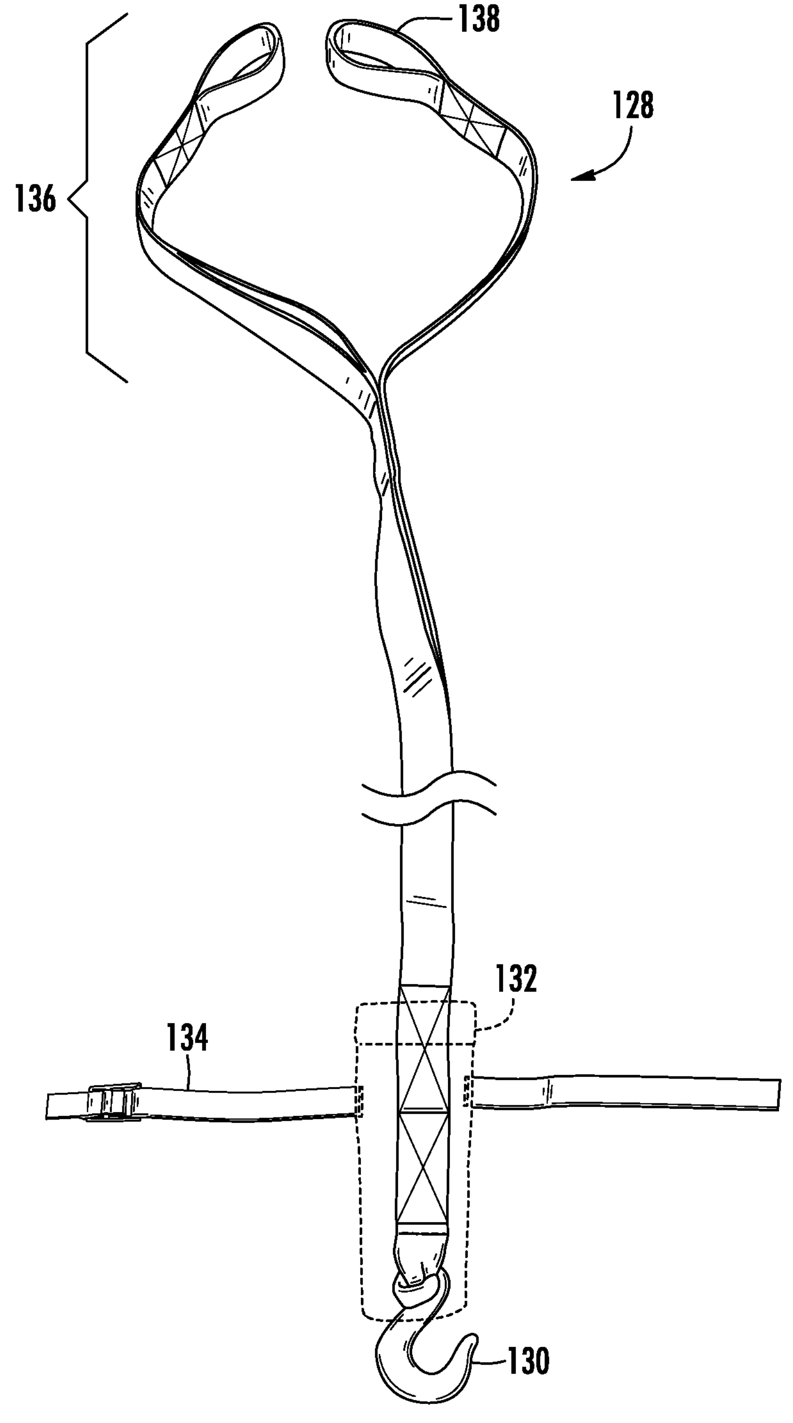
FIG. 4 illustrates a view of a lifting strap for use with the apparatus consistent with certain embodiments of the invention.

FIG. 4 presents an exemplary view of a lifting strap 128 that may be used with the apparatus to assist in hoisting and holding a pole when the apparatus is in operation. In one embodiment the present invention includes an elongated lifting strap 128 having a first end and a second end, and having an overall length sufficient to span from a point toward the bottom of a pole to a point above the pole's center of gravity. An attachment mechanism 130, such as a rated hook or other suitable mechanism is attached to the first end of the strap. In one embodiment a protective sleeve 132, such as sock, is further attached towards the first end of the lifting strap 128 such that the protective sleeve is capable of sliding over or otherwise sufficiently covering the attachment mechanism 130, e.g., hook, to prevent damage to the pole, such as scratching, caused by the attachment mechanism 130 coming into contact with the pole during use. Further, a safety or keeper strap 134 may also be attached towards the first end of the lifting strap 128. The safety strap 134 helps to prevent the attachment mechanism from sliding out of its position while in use. In one embodiment the safety strap 134 is associated with the protective sleeve 132, and also helps to keep protective sleeve 132 in place. In yet another embodiment, the safety strap 134 may include a cam buckle, D-ring and/or a hook, or other type mechanism, for easy tightening and removal. The second end of the lifting strap 128, opposite the first end, forms a "Y" shape 136 portion. Arms of the "Y" shape 136 portion are preferably substantially the same length as one another. Each arm of the "Y" shape 136 portion further includes an eyelet 138 (e.g., loop) at its distal end. The size of the "Y" shape 136 portion, length of entire lifting strap 128, material, and size of attachment mechanism 130 may vary depending on the length, width, weight, and type of the pole to be lifted. In another exemplary embodiment, the lifting strap 128 may also be a sling or hoop style strap, wherein one or more sling or hoop style straps are associated together to form the lifting strap 128.

In use the attachment mechanism 130 at the first end of the lifting strap 128 is attached to an attachment point, such as a hand-hole or other attachment point located at or near the bottom, or base, of the pole to be lifted. The protective sleeve 132 is positioned to help prevent the attachment mechanism 130 from damaging the pole (e.g., scratching, etc.). For example, the protective sleeve may be positioned substantially over the attachment mechanism 130 (e.g., hook) to prevent direct contact between the attachment mechanism 130 and the pole. Further, the safety strap 134 is preferably secured around the pole to help keep the attachment mechanism 130 and preferably, as well, the protective sleeve 132 in their proper positions during use. The arms of the "Y" shape 136 portion at the second end of the lifting strap 128 are wrapped around the pole and are joined together at the opposite side of the pole and both eyelets 138 are attached to a lifting mechanism of the apparatus, such as a hook. The lifting strap 128 is then extended from the attachment point of the pole towards the top of the pole by the lifting mechanism of the apparatus, to a point at least past the center of gravity of the pole and the lifting strap 128 is tight. At this point the pole is now ready to be lifted. Once the pole is lifted and secured in a position (e.g., installed), and tension is released by the lifting mechanism of the apparatus, the design of the lifting strap 128 allows the lifting strap 128 to slide freely down the pole for easy removal from the lifting mechanism of the apparatus and from the pole. Once the eyelets 138 and arms of the "Y" shape 136 portion are removed from around the pole, the safety strap 134 and the attachment mechanism 130 may be removed as well.

Figure 5:
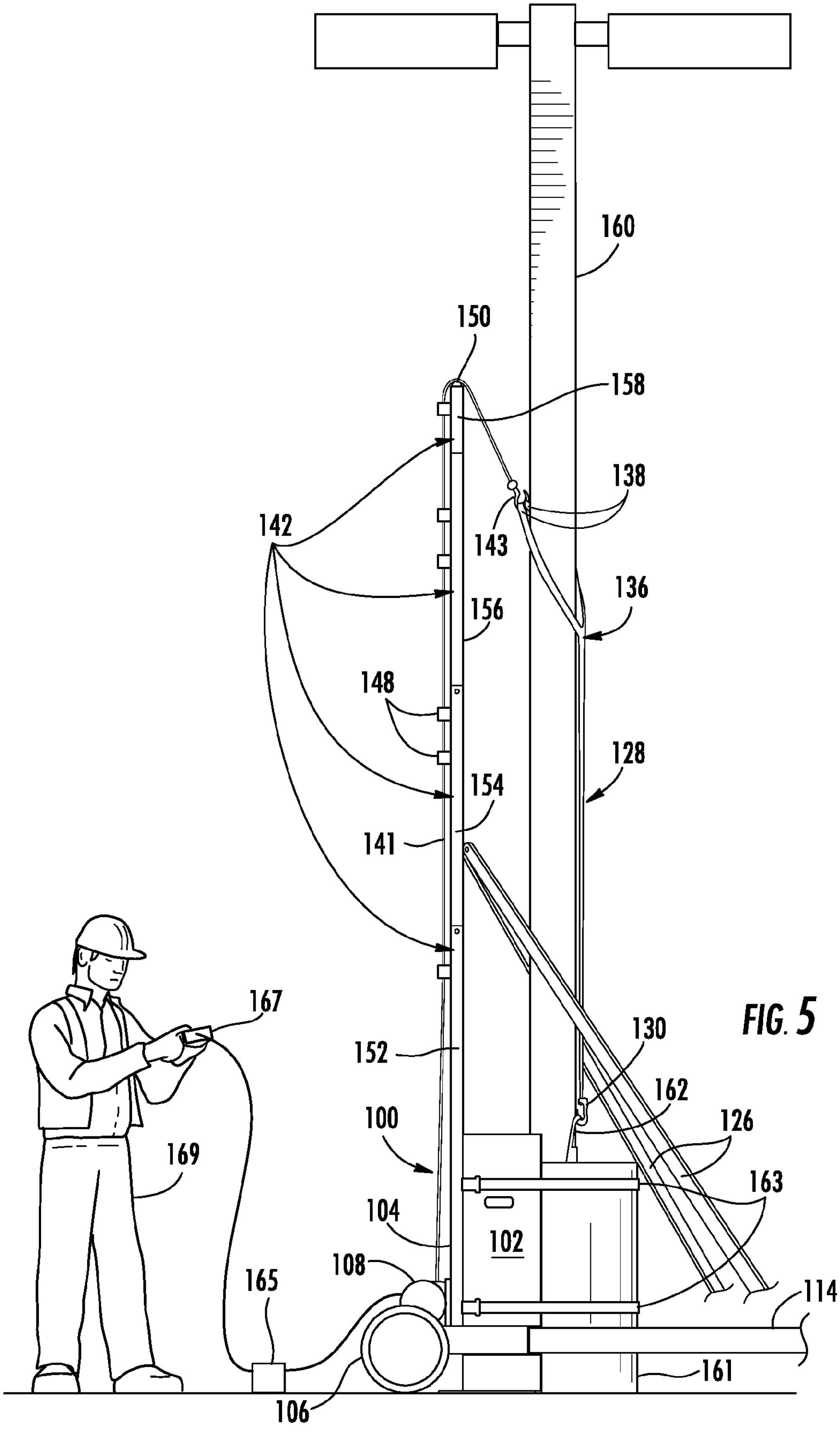
FIG. 5 illustrates a side view of the assembled apparatus in use consistent with certain embodiments of the invention.

FIG. 5 presents a side view of the assembled apparatus in use consistent with certain embodiments of the invention. In this exemplary embodiment, the base section 100 forms the base support of the entire apparatus onto which the remaining portions of the apparatus are affixed and which is used to form the basis of support when the apparatus is in use. The mast base 104 is affixed to the base section 100 within a slot or other supporting member such that the mast base 104 is held rigidly to the base section 100. In one embodiment mast base 104 is affixed to the base section 100 by a weld, using fastening hardware, such as nuts and bolts, or other suitable hardware. The distal end of the mast base 104 is substantially even with or may extend above the base section 100. Hoist 108 is configured such that wire rope 141 of sufficient strength to hoist and hold a utility pole 160 is wound upon the drum of the hoist 108. The wire rope 141 may be unwound from the hoist 108 and extended up the length of the base section 100 and further up the distance of the mast sections 142 for use in lifting and holding operations for a pole 160.

In this exemplary embodiment, one or more mast sections 142 may be inserted into the mast base 104 to extend the height of the mast to accommodate a pole 160 of varying heights, for example, ranging from about 20 feet or less to about 40 feet or more. In an embodiment one or more mast sections 142 may include a lower mast 152, a center mast 154, a top mast 156, and a pulley mast 158. The one or more mast sections 142 may range in length from about four (4) feet to about ten (10) feet. For example, lower mast 152 may be approximately five (5) feet in length, center mast 154 may be approximately five (5) feet in length, top mast 156 may be approximately five (5) feet or approximately nine (9) feet in length, and pulley mast 158 may be approximately four (4) feet in length. The one or more mast sections 142 may be used in various combinations with one another to achieve the desired mast length for the size pole to be lifted. Each of the one or more mast sections 142 preferably has one or more eyelets 148 through which a cable, such as, by way of example, a wire rope 141, and lift mechanism 143, such as a hook may be routed. The wire rope 141 is also placed around a guide, such as a pulley 150, configured at the top mast section of the one or more mast sections 142 (e.g., pulley mast 158), such that the wire rope 141 extends down from the pulley 150 to be attached to the lifting strap 128. The lifting strap 128 may be attached to the utility pole 160 by attaching attachment mechanism 130, such as a hook, associated with a first end of the lifting strap 128 at an attachment point 162, such as a hand hole, and wrapping the arms of the "Y" shape 136 portion, associated with the second end of the lifting strap 128 around the pole 160 at a point above the center of gravity of the pole 160, and attaching lift mechanism 143 to eyelets 138, which are positioned at the end of each of the arms of the "Y" shape 136 portion. In this exemplary configuration, the apparatus is attached to a pole 160 to provide lift and support for installation, repair, replacement, removal, and/or repositioning activities.

The components of the apparatus, including, for example, the base section 100, base plate 102, mast base 104, leg braces 114, angle braces 126, mast sections 142, and hoist bracket 110 are preferably made of aluminum and/or steel; however, they may be made of any suitably strong material as would be required for carrying out the operations of the apparatus.

The apparatus may further include a control box 165 which is electronically attached to a motor of the hoist 108 to control the wind and unwind operation of the wire rope 141 from the hoist 108. Control box 165, further includes a power source (not shown), which may be internal or external. In one embodiment the power source is a 12 volt rechargeable battery system. Control box 165, may further include an overload interrupter (OLI) system. The OLI prevents a user from lifting a load over the set load limit, for example 800 pounds, and may have a set variance, such as 5%. In the event of an overload, the OLI will interrupt and halt the lift operation; however, the system will still permit an operator 169 to lower the load back to the ground. Once the load is removed (e.g., on the ground), the OLI will reset and be ready for another lift. Control box 165 may be mounted to the back of the base section 100 near the hoist 108, or alternatively the control box 165 may be separate from the apparatus. Control box 165, may include a remote 167, either tethered or wirelessly connected to it, for remote operation of hoist 108 by operator 169.

Figure 6:
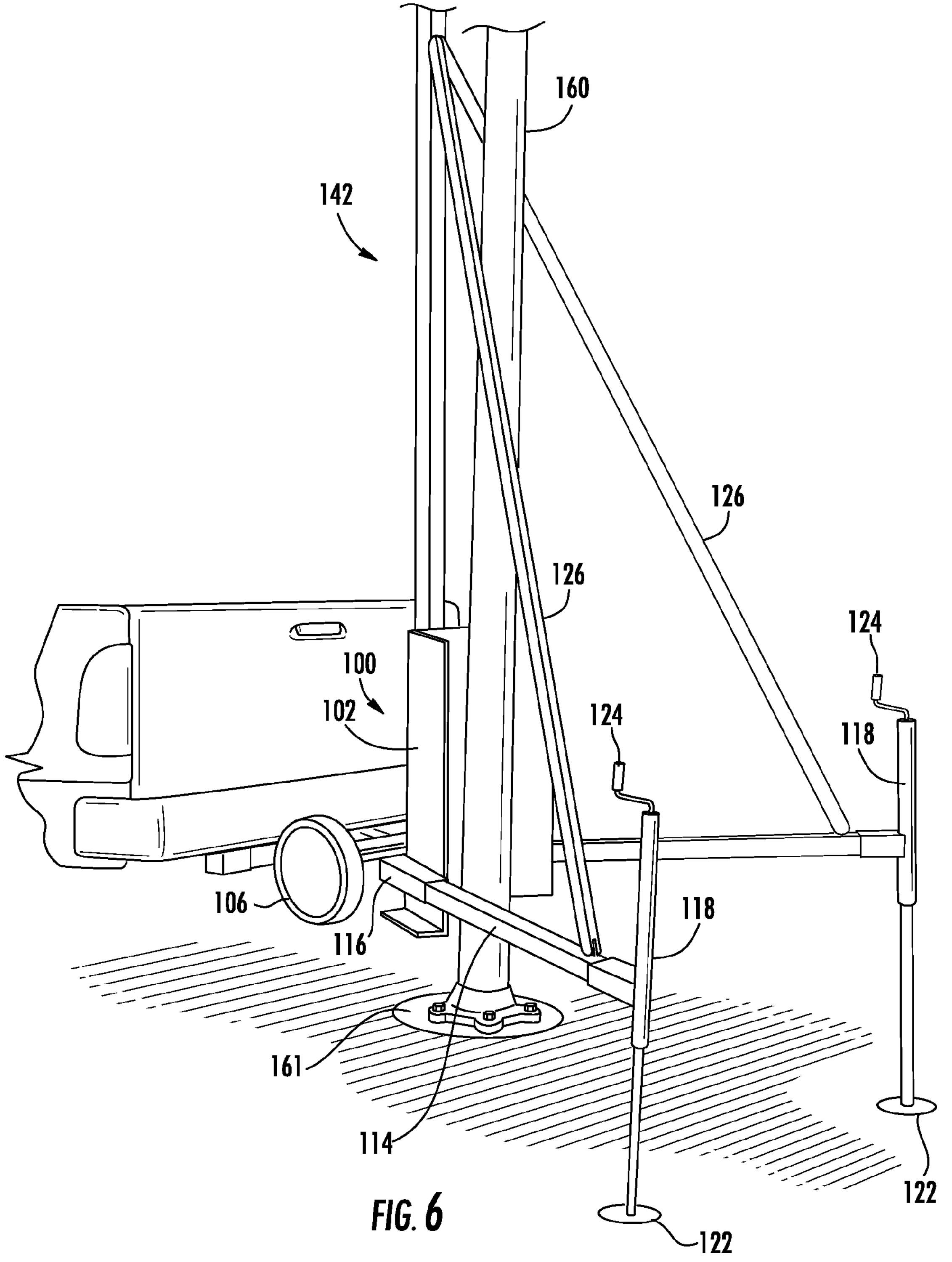
FIG. 6 illustrates another view of the apparatus consistent with certain embodiments of the invention.

FIG. 6 presents an exemplary view of an alternative embodiment of the apparatus consistent with certain embodiments of the invention. In this alternative embodiment, the apparatus may be attached to a hitch mount associated with a vehicle such as a service truck, pickup truck, service van, or other vehicle sufficient for the purpose of holding the apparatus in a stable position during pole 160 maintenance operations. For example, attaching the apparatus to a hitch mount is useful where it is not possible or feasible to secure the apparatus to a base of pole 160 using straps, such as when the pole 160 is mounted on an irregular shaped pedestal (e.g., not circular), or if the pole 160 is not mounted on a pedestal, for example, directly in or to the ground, or on a wall. In this embodiment the apparatus is attached to a vehicle's hitch mount by a hitch bar, such as hitch bar 125, extending from hitch receiver 127 of the base section 100. The hitch bar 125 may be secured to the vehicle's hitch mount and to the hitch receiver 127 through the use of securing hardware, such as one or more lynch pins (not shown), or other suitable securing hardware.

Figure 7:
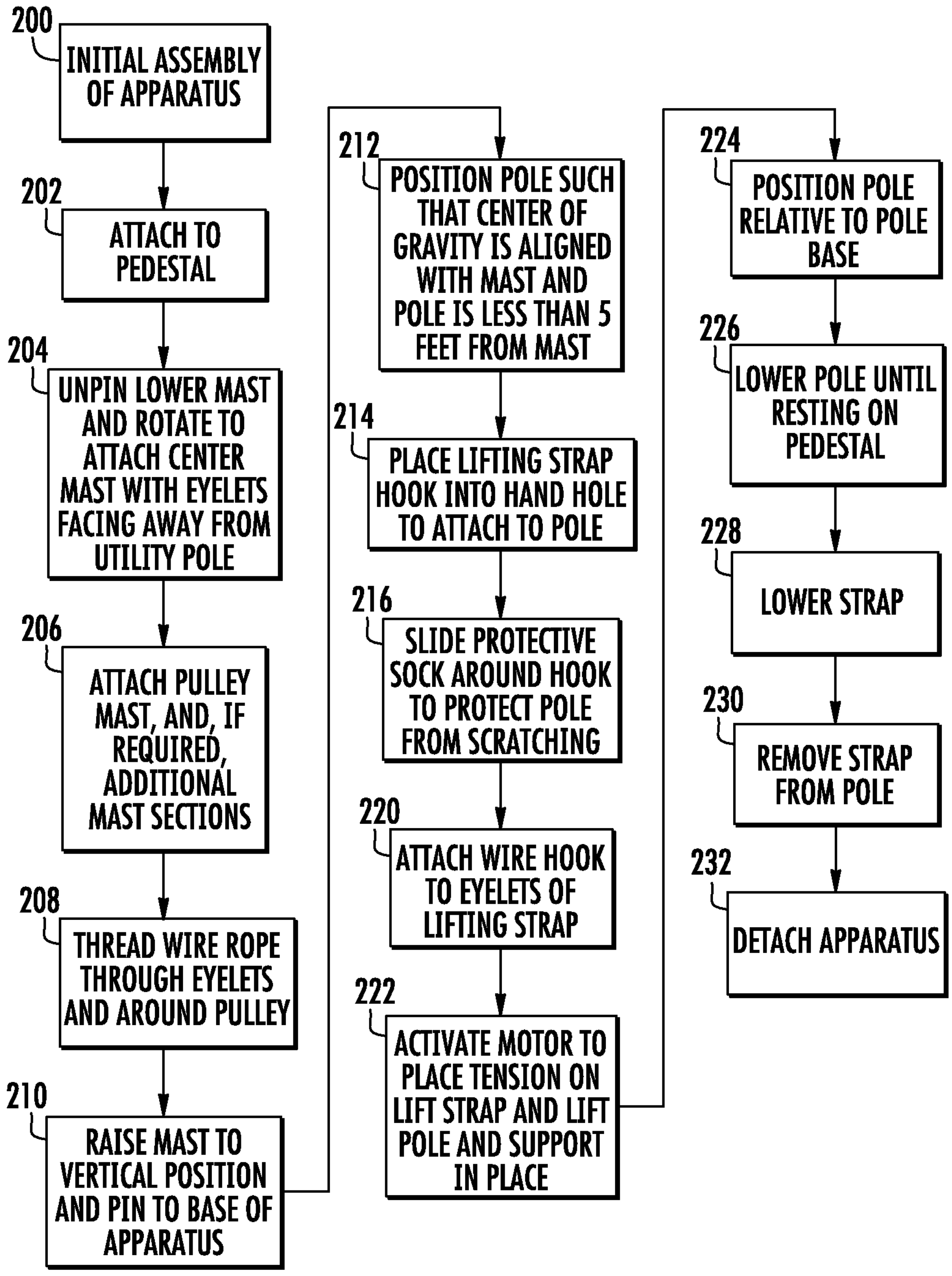
FIG. 7 illustrates a flow diagram for the operation of the apparatus consistent with certain embodiments of the invention.

FIG. 7 presents a flow diagram for the operation of the apparatus consistent with certain embodiments of the invention. The apparatus may be configured to install, support, service, and/or remove a pole 160 on or from a pole mount 161 (such as a concrete/steel pedestal), or that may be free standing, associated with another structure, or embedded within a primary structure. In an exemplary embodiment the apparatus may be configured to lift, support, place, and/or remove pole 160 by conducting an initial assembly of the apparatus at 200. The apparatus is typically transported initially in an unassembled state to a work site. The initial assembly may be performed by one or two persons consistent with the assembly instructions contained in the instructional video available at www.lightpoledancer.com, or by using the assembly instructions in the apparatus owner's manual that may be delivered with the apparatus and also available at www.lightpoledancer.com for viewing or download. For example, initial assembly of the apparatus may include attaching the hoist 108 to the base section 100 with one or more securing pins (not shown) and inserting the lower mast section 152 into mast base 104 and securing the lower mast section 152 with one or more securing pins (not shown).

Upon completion of the apparatus initial assembly, at 202 the apparatus may be attached to a pole mount 161 upon which pole 160 is to be installed or detached, using, for example, one or more ratchet straps 163 (see FIG. 5). In an alternative embodiment, and as shown in FIG. 6, the apparatus may be attached to a hitch mount associated with a vehicle such as a service truck, pickup truck, service van, or other vehicle sufficient for the purpose of holding the apparatus in a stable position during utility pole maintenance operations. The leg braces 114 and jacks 118 are attached to the base section with one or more securing pins (not shown) and the apparatus is leveled and the one or more ratchet straps 163 tightened. At 204 and 206, operator 169 of the apparatus may unpin the lower mast 152 from the mast base 104 and rotate the lower mast 152 from a vertical to horizontal position to facilitate attaching one or more additional mast sections 142. One or more mast sections 142 may consist of one or more sections, such as lower mast 152, center mast 154, top mast 156, and/or pulley mast 158, to accommodate a pole 160 of different heights. In an embodiment, if the pole 160 is 20 feet tall or less, the user may attach only the lower mast 152 and pulley mast 158, with the eyelets 148 on the lower mast 152 and pulley mast 158 disposed on the side of the apparatus facing away from the pole 160. If the pole 160 is taller than 20 feet but less than or equal to 30 feet in height, an additional mast section 142, such as center mast 154, may be inserted between the lower mast 152 and pulley mast 158. The center mast 154 may be, for example, approximately five (5) feet in length. If the pole 160 is taller than 30 feet but less than or equal to 40 feet in height, an additional mast length 142, such as top mast 156, may be inserted between the center mast 154 and the pulley mast 158. The top mast 156 may be, for example, approximately nine (9) feet in length. In this manner, the apparatus may accommodate operations with a pole 160 up to about forty feet in height. It is contemplated poles 160 of greater than 40 feet may be serviced with the use of additional mast sections 142. After attaching the pulley mast 158, at 208, wire rope 141 from the hoist 108 having lift mechanism 143, such as a hook, on the end of the wire rope 141 is routed through the eyelets 148 of the assembled one or more mast sections 142 and around pulley 150 such that the lift mechanism 143 is past the pulley 150 and such that the wire rope 141 may continue to be pulled through the pulley 150 in either direction as necessary to raise or lower the pole 160 during operation. The lower mast 152, including any mast sections 142 attached thereto, is then rotated at 210 from horizontal to a vertical orientation and the lower mast 152 pinned to the base section 100 in the vertical position and the control box 165 may be electronically attached to the hoist 108 to control the wind and unwind operation of the wire rope 141 from the hoist 108. In this exemplary embodiment the apparatus is now prepared for use in installing, supporting, and/or removing utility pole 160.

In the exemplary embodiment the pole 160 to be used in an installation procedure may be positioned such that the center of gravity for the pole 160 is aligned with the mast section 142, with the center of gravity for the pole 160 preferentially five feet or less away from the mast at 212. At 214, the operator 169 may then place attachment mechanism 130 of the lifting strap 128 into the attachment point 162 of the pole 160 and securely attaches the proximal end of the lifting strap 128 to the pole 160. At 216, the operator 169 may then slide the protective sleeve 132 over the attachment mechanism 130 of the lifting strap 128 to prevent the attachment mechanism 130 from scratching the pole 160. At 220, the operator may then attach the "Y" shape 136 portion of the lifting strap 128 to the pole 160 by wrapping the arms of the "Y" shape 136 portion around the pole 160 at a point above the center of gravity of the pole 160. Each arm of the "Y" shape 136 portion of the lifting strap 128 has an eyelet 138, such as a triangle grommet, at the distal portion of each arm of the "Y" shape 136 portion. The operator 169 may then place the lifting mechanism 143 attached at the end of the wire rope 141 through the eyelets 138 in preparation for placing tension on the lifting strap 128. At 222, the operator 169 may activate the motor of the hoist 108, via control box 165, to begin reeling in the wire rope 141 to place tension on the lifting strap 128 and lift the pole 160 to a vertical position, where the pole 160 may be supported in place during the installation operation. At 224, the operator 169 may position the supported pole 160 over the bolts embedded within the pole mount 161 and, at 226, the operator 169 may then lower the pole 160 until the base of the pole 160 is resting on the pole mount 161 with the bolts inserted through holes placed in the base of pole 160 for this purpose. The operator 169 may then place nuts onto the bolts and securely fasten the pole 160 to the pole mount 161 while the apparatus supports the pole 160 in position.

With the pole 160 securely fastened to the pole mount 161, the operator 169 may then reverse the motor on the hoist 108 to lower the lifting strap 128 at 228. The "Y" shape 136 portion design of the lifting strap 128 allows the lifting strap 128 to slide readily down the pole 160, regardless of the geometry of the pole 160 relative to the diameter, shape and style, such as round, square, polygonal, or irregular shape, and such that the lifting strap 128 readily lowers to a position where the operator 169 may reach the eyelets 138 through which the lifting mechanism 143 associated with the wire rope 141 are secured. At 230, the operator 169 removes the lifting mechanism 143 associated with the wire rope 141 from the eyelets 138 of the lifting strap 128 and detaches the lifting strap 128 from the pole 160. At this point and at 232, the pole 160 exemplary set operation is complete and the apparatus may then be detached from the pole mount 161 and relocated to another pole 160 for continuing operations, or the apparatus may be disassembled and removed from the location. This is but one exemplary operation for which this apparatus may be used. The apparatus may also be used in alternative exemplary operations to lift and support an already installed pole 160 during repair operations, or the apparatus may be used to remove an existing pole 160 and install a different pole 160 as a replacement. Each of these operations proceeds in a similar manner to the above exemplary setting operation by first assembling the apparatus and attaching the lifting strap 128 strap to the pole 160 and supporting the weight of the pole 160 through the use of the wire rope 141 attached to the hoist 108. In each of these exemplary operations, one or two operators may use the apparatus to lift and/or support the pole 160 while installing, repairing, and/or replacing a pole 160 without having to rent or arrange for expensive, heavy-duty crane or lifting equipment.

7 CONCLUDING REMARKS

The foregoing detailed description of embodiments refers to the accompanying drawings, which illustrate specific embodiments of the invention. Other embodiments having different structures and operations do not depart from the scope of the present invention. The term "the invention" or the like is used with reference to certain specific examples of the many alternative aspects or embodiments of the applicant's invention set forth in this specification, and neither its use nor its absence is intended to limit the scope of the applicant's invention or the scope of the claims. This specification is divided into sections for the convenience of the reader only. Headings should not be construed as limiting of the scope of the invention. The definitions are intended as a part of the description of the invention. It will be understood that various details of the present invention may be changed without departing from the scope of the present invention. Furthermore, the foregoing description is for the purpose of illustration only, and not for the purpose of limitation.

I claim:

1. A pole lifting apparatus comprising:

a base section comprising a base plate, with the base plate securable to a pole, said pole comprising a pole pedestal mount with said base plate engaging the pole pedestal mount via one or more straps;

one or more mast sections, the one or more mast sections each comprising one or more eyelets for receiving a wire rope, and at least one of said mast sections connected to the base section and extendable in an axial manner therewith, wherein an uppermost mast section of the one or more mast sections comprises a guide comprising a pulley mounted at its uppermost end;

a hoist secured to the base section at a substantially lowermost position on the base section and having the wire rope operably associated with the one or more mast sections and guide for use in a pole lifting operation, with said wire rope further comprises a hook attached at its distal end;

an elongated lifting strap comprising an attachment mechanism at a proximal end and a "Y"-shaped portion at a distal end configured to engage the wire rope, said elongated lifting strap configured to be secured at an attachment point near a base portion of the pole and the "Y"-shaped portion configured to surround the pole at a point above a center of gravity of the pole to support the weight of the pole when tension is placed on the lifting strap by the wire rope and said pole is lifted to a vertical position, said lifting strap further comprising a protective sleeve to cover the hook when in use, eyelets at the distal end of each arm of the "Y"-shaped portion;

a keeper strap in communication with the lifting strap configured to maintain the attachment mechanism of the lifting strap in communication with the attachment point; and at least first and second leg braces attached at their proximal ends to a first and second side of the base section respectively, wherein the first and second leg braces extend out at an angle from the base section, said first and second leg braces each further comprising an adjustable leg attached at their distal ends, with the first and second leg braces and associated adjustable legs configured to facilitate stabilizing and leveling the pole lifting apparatus during use.

2. The pole lifting apparatus of claim 1 wherein the one or more mast sections each range from about four (4) feet to about ten (10) feet in length.

3. The pole lifting apparatus of claim 1 wherein the one or more mast sections comprise two or more of a lower mast section, a center mast section, a top mast section, and a pulley mast section.

4. The pole lifting apparatus of claim 1 wherein the base section further comprises a plurality of wheels.

5. The pole lifting apparatus of claim 1 wherein the one or more mast sections are telescoping.

6. The pole lifting apparatus of claim 1 wherein one or more mast sections comprises a lower mast section, and wherein the lower mast section is hingeably attached to the base section.

7. The pole lifting apparatus of claim 1 further comprising a mast base attached to the base section for receiving a bottom portion of a lower mast section of the one or more mast sections.

8. The pole lifting apparatus of claim 1 wherein the pole comprises a light pole.

9. The pole lifting apparatus of claim 1 wherein the pole comprises a utility pole.

10. The pole lifting apparatus of claim 1 wherein the apparatus is attached to a vehicle's hitch mount.

11. The pole lifting apparatus of claim 1 wherein the attachment point comprises a hand hole of the pole.

12. The pole lifting apparatus of claim 1 further comprising electronic controls electronically connected to the hoist to operate the functions of the hoist.

13. The pole lifting apparatus of claim 12 further comprising a remote either tethered or wirelessly connected to electronic controls for remote operation of the electronic controls of the apparatus.

14. The pole lifting apparatus of claim 1 wherein the first and second leg braces extend out at one of about a 45 degree, 90 degree, and 180 degree angle from the base section.

15. The pole lifting apparatus of claim 1 wherein at least one of adjustable legs comprises a jack, a leveling foot, and a jack handle.

16. The pole lifting apparatus of claim 1 further comprising first and second angle braces attached to the first and second leg braces, respectively, at a proximal end of the angle braces and to a mast section of the one or more mast sections at a distal end of the angle braces.

17. The pole lifting apparatus of claim 16 wherein the angle braces form about a 45 degree angle with their associated leg brace and mast section.

18. The pole lifting apparatus of claim 1 further comprising a third leg brace attached at its proximal end to a back portion of the base section, wherein the third leg brace extends out at an angle from the base section.

19. The pole lifting apparatus of claim 18 wherein the base section further comprises a hitch receiver at the back portion of the base section and wherein the third leg brace attaches at its proximal end to the hitch receiver.

20. The pole lifting apparatus of claim 18 wherein the third leg brace extends out at about a 90 degree angle from the back portion of the base section.

21. The pole lifting apparatus of claim 18 wherein the third leg brace further comprises an adjustable leg attached at its distal end, the adjustable leg comprising a jack, a plate foot, and a jack handle.

22. The pole lifting apparatus of claim 21 wherein the third leg brace and associated adjustable leg is configured to facilitate stabilizing and leveling the pole lifting apparatus during use.

23. The pole lifting apparatus of claim 21 wherein the plate foot comprises a steel plate.

24. The pole lifting apparatus of claim 21 wherein the plate foot is configured in size and shape to accommodate a vehicle tire to rest upon it to secure it in position.

25. The pole lifting apparatus of claim 18 further comprising a third angle brace attached to the third leg brace at a proximal end of the third angle brace and to a mast section of the one or more mast sections at a distal end of the third angle brace.

26. The pole lifting apparatus of claim 25 wherein the third angle brace forms about a 45 degree angle with its associated leg brace and mast section.

27. A method for manipulating a pole comprising:

(a) providing a pole lifting apparatus, comprising:

(i) a base section comprising a base plate, with the base plate securable to a pole, said pole comprising a pole pedestal mount with said base plate engaging the pole pedestal mount via one or more straps;

(ii) one or more mast sections, the one or more mast sections each comprising one or more eyelets for receiving a wire rope, and at least one of said mast sections connected to the base section and extendable in an axial manner therewith, wherein an uppermost mast section of the one or more mast sections comprises a guide comprising a pulley mounted at its uppermost end;

(iii) a hoist secured to the base section at a substantially lowermost position on the base section and having the wire rope operably associated with the one or more mast sections and guide for use in a pole lifting operation, with said wire rope further comprises a hook attached at its distal end;

(iv) an elongated lifting strap comprising an attachment mechanism at a proximal end and a "Y"-shaped portion at a distal end configured to engage the wire rope, said elongated lifting strap configured to be secured at an attachment point near a base portion of the pole and the "Y"-shaped portion configured to surround the pole at a point above a center of gravity of the pole to support the weight of the pole when tension is placed on the lifting strap by the wire rope and said pole is lifted to a vertical position, said lifting strap further comprising a protective sleeve to cover the hook when in use, eyelets at the distal end of each arm of the "Y"-shaped portion;

(v) a keeper strap in communication with the lifting strap configured to maintain the attachment mechanism of the lifting strap in communication with the attachment point; and (vi) at least first and second leg braces attached at their proximal ends to a first and second side of the base section respectively, wherein the first and second leg braces extend out at an angle from the base section, said first and second leg braces each further comprising an adjustable leg attached at their distal ends, with the first and second leg braces and associated adjustable legs configured to facilitate stabilizing and leveling the pole lifting apparatus during use;

(b) securing the pole lifting apparatus to the pole or a pole mount;

(c) assembling the one or more mast sections to a desired height and routing the wire rope from the hoist around the guide atop the mast sections, such that the distal end of the wire rope is past the guide;

(d) attaching a lifting strap to the pole and attaching the distal end of the wire rope to the lifting strap; and (e) operating the hoist to wind and/or unwind the wire rope thus pulling and releasing tension on the lifting strap to manipulate the pole to or from a vertical position.

* * * * *